United States Patent
Vampola et al.

(10) Patent No.: US 10,063,797 B2
(45) Date of Patent: Aug. 28, 2018

(54) EXTENDED HIGH DYNAMIC RANGE DIRECT INJECTION CIRCUIT FOR IMAGING APPLICATIONS

(71) Applicant: RAYTHEON COMPANY, Waltham, MA (US)

(72) Inventors: John L. Vampola, Santa Barbara, CA (US); Micky R. Harris, Lompoc, CA (US); Bryan W. Kean, Denver, CO (US); Steven Botts, Santa Barbara, CA (US); Richard J. Peralta, Santa Barbara, CA (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 15/388,023

(22) Filed: Dec. 22, 2016

(65) Prior Publication Data

US 2018/0184020 A1   Jun. 28, 2018

(51) Int. Cl.
*H04N 5/355* (2011.01)
*H04N 5/378* (2011.01)
(Continued)

(52) U.S. Cl.
CPC ......... *H04N 5/3559* (2013.01); *H04N 5/3535* (2013.01); *H04N 5/378* (2013.01); *H04N 5/3742* (2013.01)

(58) Field of Classification Search
CPC ... H04N 5/3559; H04N 5/3535; H04N 5/3742
See application file for complete search history.

(56) References Cited

U.S. PATENT DOCUMENTS 9,521,351 B1* 12/2016 Endsley .................. H04N 5/378
9,531,976 B2* 12/2016 Korobov ............ H04N 5/37452
(Continued)

FOREIGN PATENT DOCUMENTS

| EP | 1868377 A1 | 12/2007 |
| EP | 2362642 A1 | 8/2011 |
| EP | 2574043 A2 | 3/2013 |

OTHER PUBLICATIONS

U.S. Appl. No. 14/984,571, filed Dec. 30, 2015, Christian M. Boemler.
(Continued)

*Primary Examiner* — Amy Hsu
(74) *Attorney, Agent, or Firm* — Lando & Anastasi, LLP

(57) ABSTRACT

According to one aspect, embodiments herein provide a unit cell circuit comprising a photodetector configured to generate a photo-current in response to receiving light, a first integration capacitor configured to accumulate charge corresponding to the photo-current, a second integration capacitor configured to accumulate charge corresponding to the photo-current, a charge diverting switch coupled to the photodetector and configured to selectively couple the first integration capacitor to the second integration capacitor and divert the photo-current to the second integration capacitor in response to a voltage across the first integration capacitor exceeding a threshold level, and read-out circuitry coupled to the first integration capacitor and the charge diverting switch and configured to read-out a first voltage sample from the first integration capacitor corresponding to charge accumulated on the first integration capacitor and to read-out a second voltage sample from the second integration capacitor corresponding to charge accumulated on the second integration capacitor.

16 Claims, 8 Drawing Sheets

(51) Int. Cl.
*H04N 5/374* (2011.01)
*H04N 5/353* (2011.01)

(56) References Cited

U.S. PATENT DOCUMENTS

| | | | |
|---|---|---|---|
| 9,578,262 B2* | 2/2017 | Dowaki | H04N 5/343 |
| 2010/0140452 A1 | 6/2010 | Vampola et al. | |
| 2015/0350584 A1* | 12/2015 | Fenigstein | H04N 5/355 |
| | | | 250/208.1 |
| 2016/0134820 A1 | 5/2016 | Kean et al. | |
| 2017/0195595 A1* | 7/2017 | Boemler | H04N 5/3575 |

OTHER PUBLICATIONS

International Search Report and Written Opinion for application No. PCT/US2017/043449 dated Oct. 23, 2017.

* cited by examiner

EXTENDED HIGH DYNAMIC RANGE DIRECT INJECTION CIRCUIT FOR IMAGING APPLICATIONS

BACKGROUND

Image sensors used in image capture devices generate charge in proportion to light intensity received at the image sensor from a scene viewed by the image sensor. Imaging of scenes with low ambient light requires an image sensor to have components with low noise and low capacitance in order to provide high sensitivity. In contrast, imaging a scene with bright ambient light requires the image sensor to have components with higher capacitance in order to store the generated charge. These competing capacitance requirements have led to the development of image capture devices typically being optimized for either a bright ambient light scene or a low ambient light scene.

SUMMARY

Aspects and embodiments described herein are directed to a high dynamic range direct injection circuit that can be used to image scenes with varying light conditions. In certain examples, the circuit includes two integration capacitors at the output side of an input transistor. A first integration capacitor has a relatively small capacitance and provides high gain to low-level image signals. A second integration capacitor has a relatively large capacitance and is connected in series with a threshold switch. The second integration capacitor and the threshold switch together are connected in parallel with the first integration capacitor. If the charge on the first integration capacitor increases above a certain level, for example under bright illumination conditions, the voltage across the first integration capacitor will exceed that of the threshold switch, and excessive charge that normally would be lost by circuit saturation is instead stored on the larger second integration capacitor. By diverting excess charge to the larger integration capacitor rather than losing the excess charge once the smaller integration capacitor is saturated, the unit cell described herein is optimized for two different applications (i.e., low and high ambient light applications) with a single or varying integration periods and the dynamic range of the unit cell is increased.

At least one aspect described herein is directed to a unit cell circuit comprising a photodetector configured to generate a photo-current in response to receiving light, a first integration capacitor coupled to the photodetector and configured to accumulate charge corresponding to the photo-current, a second integration capacitor configured to accumulate charge corresponding to the photo-current, a charge diverting switch coupled to the photodetector and configured to selectively couple the first integration capacitor to the second integration capacitor and divert the photo-current to the second integration capacitor in response to a voltage across the first integration capacitor exceeding a threshold voltage level, and read-out circuitry coupled to the first integration capacitor and the charge diverting switch and configured to read-out a first voltage sample from the first integration capacitor corresponding to charge accumulated on the first integration capacitor and to read-out a second voltage sample from the second integration capacitor corresponding to charge accumulated on the second integration capacitor.

According to one embodiment, the charge diverting switch is a MOSFET and the threshold voltage level is defined by a bias voltage received by a gate of the charge diverting switch. In one embodiment, a capacitance value of the second integration capacitor is at least twenty times larger than a capacitance value of the first integration capacitor. In one embodiment, the unit cell circuit further comprises a shutter switch coupled between the photodiode and the first integration capacitor and configured to open when the read-out circuitry is reading-out the first voltage sample and the second voltage sample.

According to another embodiment, the unit cell circuit further comprises an image processor coupled to the charge diverting switch and the read-out circuitry, wherein in a first mode of operation, the image processor is configured to operate the read-out circuitry to provide the first voltage sample to the image processor, and wherein in a second mode of operation, the image processor is configured to operate the charge diverting switch to close, coupling the first integration capacitor to the second integration capacitor, and to operate the read-out circuitry to provide the second voltage sample to the image processor.

According to one embodiment, the image processor is further configured to analyze the first voltage sample and the second voltage sample to determine whether either one of the first voltage sample and the second voltage sample is invalid. In one embodiment, the image processor is further configured to determine that the first voltage sample is invalid in response to identifying that the first voltage sample indicates a saturated first integration capacitor. In another embodiment, the image processor is further configured to determine that the second voltage sample is invalid in response to identifying that the second voltage sample is substantially at a reset level. In one embodiment, the read-out circuit comprises a buffer coupled to the first integration capacitor, and a row enable switch coupled to the buffer and to the image processor, wherein, in the first and second modes of operation, the image processor is further configured to operate the row enable switch to couple the buffer to the image processor.

According to another embodiment, the read-out circuit comprises a first shutter switch coupled to the first integration capacitor, a first shutter capacitor selectively coupled to the first shutter switch, a first buffer coupled to the first shutter capacitor, and a first row enable switch coupled to the first buffer, wherein, in the first mode of operation, the image processor is further configured to operate the first shutter switch to open such that the first voltage sample is stored on the first shutter capacitor. In one embodiment, the read-out circuit comprises a second shutter switch coupled to the first integration capacitor, a second shutter capacitor selectively coupled to the second shutter switch, a second buffer coupled to the second shutter capacitor, and a second row enable switch coupled to the second buffer, wherein, in the second mode of operation, the image processor is further configured to operate the second shutter switch to open such that the second voltage sample is stored on the second shutter capacitor. In another embodiment, in the first mode of operation, the image processor is further configured to operate the first row enable switch to couple the first buffer to the image processor, and in the second mode of operation, the image processor is further configured to operate the second row enable switch to couple the second buffer to the image processor.

Another aspect described herein is directed to a method for operating a unit cell circuit comprising a photodetector, a first integration capacitor coupled to the photodetector, a charge diverting switch coupled to the photodetector, a second integration capacitor coupled to the charge diverting switch, and read-out circuitry coupled to the first integration capacitor and the charge diverting switch, the method comprising generating, by the photodetector, photo-current in response to receiving light, accumulating charge on the first integration capacitor corresponding to the photo-current, diverting, with the charge diverting switch, the photo-current to the second integration capacitor in response to a voltage across the first integration capacitor exceeding a threshold voltage level, and reading-out, in a first most of operation, a first voltage sample from the first integration capacitor corresponding to charge accumulated on the first integration capacitor, coupling, in a second mode of operation, the first integration capacitor in parallel with the second integration capacitor, and reading-out, in the second mode of operation, a second voltage sample corresponding to charge accumulated on the second integration capacitor.

According to one embodiment, the method further comprises receiving, with the charge diverting switch a bias voltage, and diverting charge from the first integration capacitor to the second integration capacitor in response to a voltage across the first integration capacitor exceeding a threshold voltage level includes diverting charge from the first integration capacitor to the second integration capacitor in response to the voltage across the first integration capacitor exceeding the bias voltage. In one embodiment, the method further comprises de-coupling with a shutter switch, in the first and second modes of operation, the photodetector from the first integration capacitor and the charge diverting switch.

According to another embodiment, the method further comprises analyzing the first voltage sample and the second voltage sample to determine whether either one of the first voltage sample and the second voltage sample is invalid. In one embodiment, analyzing comprises determining that the first voltage sample is invalid in response to identifying that the first voltage sample indicates a saturated first integration capacitor, and determining that the second voltage sample is invalid in response to identifying that the second voltage sample is substantially at a reset level.

At least one aspect described herein is directed to an image sensor comprising an image processor, and a plurality of unit cells coupled to the image processor and configured in an array, each unit cell comprising a photodetector configured to generate a photo-current in response to receiving light, a first integration capacitor coupled to the photodetector and configured to accumulate charge corresponding to the photo-current, a second integration capacitor configured to accumulate charge corresponding to the photo-current, a charge diverting switch coupled to the photodetector and configured to selectively couple the first integration capacitor to the second integration capacitor and divert the photo-current to the second integration capacitor in response to a voltage across the first integration capacitor exceeding a threshold voltage level, and means for reading-out a small well voltage sample from the first integration capacitor to the image processor in a first mode of operation and for reading-out a large well voltage sample from the second integration capacitor to the image processor in a second mode of operation.

According to one embodiment, the image processor is further configured to analyze the small well voltage sample and the large well voltage sample from each unit cell to determine whether either one of the small well voltage sample and the large well voltage sample from each unit cell is invalid. In one embodiment, the image processor is further configured to generate, based on the analysis of the small well voltage sample and the large well voltage sample of each unit cell, a digital image based on at least one of the first voltage sample and the second voltage sample from each unit cell.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
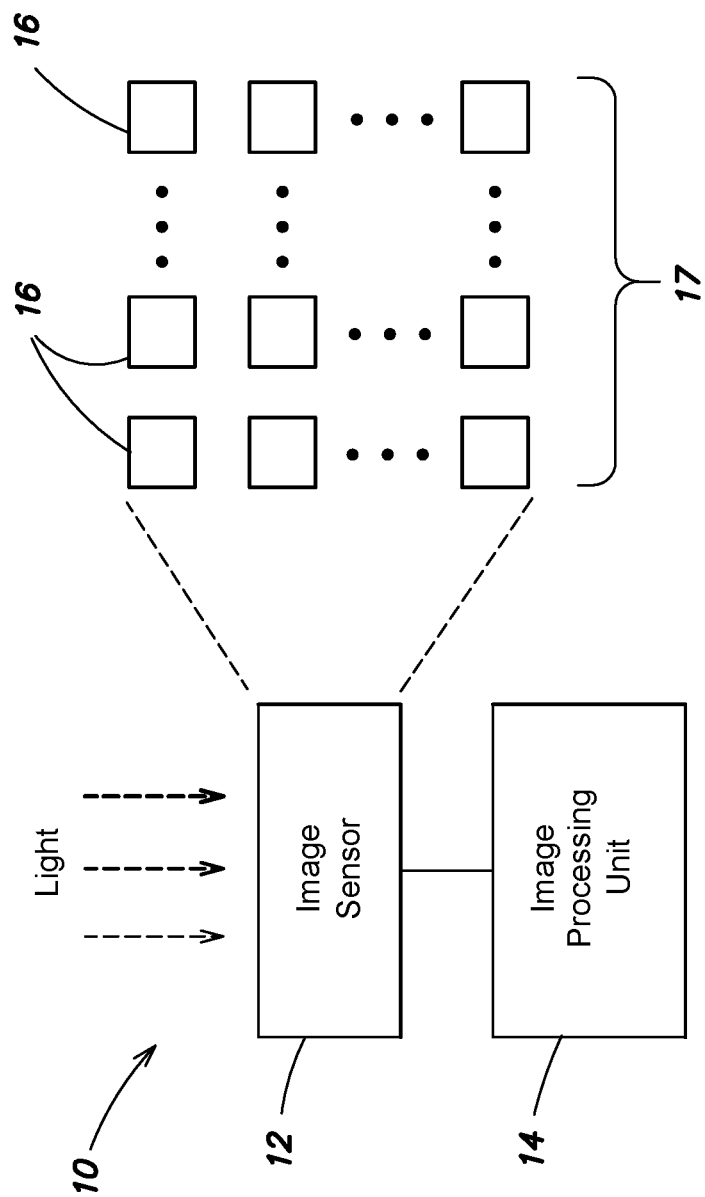
FIG. 1 is a block diagram illustrating an image capture device that may be used to capture images in accordance with aspects of the present invention.

There are many different types of image capturing devices, such as digital cameras, video cameras, or other photographic and/or image capturing equipment. These image capturing devices may use image sensors, such as Active Pixel Sensors (APS) or other suitable light sensing devices, to capture images from a desired scene. For example, an APS may be composed of a unit cell array that receives light via a lens or other optic. The light causes each unit cell to accumulate an electric charge proportional to the intensity of the light at the location of that unit cell. Each unit cell in the array typically includes circuitry such as a photo-diode, a capacitor and other components.

Each unit cell in an array generally corresponds to a picture element, or pixel, in the final image of the desired scene. A pixel is considered the smallest portion of a digital image. A digital image is generally made up of an array of pixels. Circuitry coupled to the image capturing device may perform post light capture processing steps to convert the accumulated charges from each unit cell into pixel information. This information may include the color, saturation, brightness, or other information that a digital image storage format may require. Digital images may be stored in formats such as .JPG, .GIF, .TIFF, or any other suitable format.

As discussed above, typical image capture devices are generally optimized for either a bright ambient light scene (i.e., a low sensor sensitivity situation) or a low ambient light scene (i.e., a high sensor sensitivity situation). In a low ambient light situation, such as with shadows, pictures taken at night, pictures taken indoors, or other situations where there is a relatively low amount of ambient light, an image capture device generally requires a higher sensitivity (i.e., higher gain) to adequately differentiate different levels of electric charge accumulated in its unit cells. However, the exposure of a high-sensitivity/high-gain image capture device (i.e., a device configured to provide a high signal to noise ratio for low signal regions) to a bright ambient light situation may result in image saturation.

In addition, in high sensitivity devices, parasitic capacitance (i.e., the capacitance that exists between parts of a circuit) should be minimized as small changes in the units of charge of the circuit may correspond to different levels in a final image. For example, in a high sensitivity device, an additional five units of charge could result in a different level of brightness in the final image, whereas in a low sensitivity device, an additional fifty units of charge could result in a different level of brightness in the final image. Accordingly, if an image capture device having a high parasitic capacitance is exposed to a low ambient light scene, the accumulated charge in the image capture device may not proportionally (or accurately) reflect the light intensity of the scene, which may ultimately lead to errors in the final image.

A bright ambient light situation, such as a sunny day, a well-lit room, or another situation where there is a relatively large amount of ambient light (e.g., where the intensity of the ambient light is several orders of magnitude greater than a low intensity light situation), may present a different problem. In a bright ambient light situation, a much larger amount of charge accumulates in an image capture device due to the greater intensity of light captured by the image capture device. This larger amount of charge generally requires the addition of a capacitor to store the accumulated charge generated at the image sensor. Typically, the influence of a parasitic capacitor can be taken into account when designing the above-mentioned capacitor to ensure that a sufficient amount of charge can be held in a pixel. Such an image capture device, optimized for bright ambient light situations, can typically be a low sensitivity (i.e., low gain) device. Thus, an image capture device that is optimized for a bright ambient light situation would not perform optimally in a low ambient light situation due to the difference in accumulated charge, gain, and capacitance requirements for the two situations (i.e., the low and bright ambient light situations).

Direct Injection (DI) circuits are commonly employed in focal plane applications and traditionally have difficulty in handling the different requirements of low and bright ambient light situations, as described above. More specifically, DI circuits are typically configured for a fixed gain (or charge capacity) which can result in too little gain for the dark regions of an image, or too much gain (i.e., saturation) for the bright regions of an image. Accordingly a new high dynamic range direct injection circuit is provided that can adequately handle both low and bright ambient light situations.

Embodiments of the high dynamic range direct injection circuit described herein include two integration capacitors at the output side of an input transistor. A first integration capacitor has a relatively small capacitance and provides high gain to low-level image signals. A second integration capacitor has a relatively large capacitance and is connected in series with a threshold switch. The second integration capacitor and the threshold switch together are connected in parallel with the first integration capacitor. If the charge on the first integration capacitor accumulates above a certain level, for example as may occur under high illumination conditions, the voltage across the first integration capacitor will exceed that of the threshold switch and excessive charge that normally would be lost by circuit saturation is instead diverted to and stored on the larger second integration capacitor.

FIG. 1 is a block diagram illustrating an image capture device 10 that may be used to capture images. For example, the image capture device 10 may be a digital camera, video camera, or other photographic and/or image capturing equipment. The image capture device 10 includes an image sensor 12 and an image processing unit 14 (e.g., an image processor or controller configured to perform image processing). The image sensor 12 may be an APS or other suitable light sensing device that can capture images. The image processing unit 14 may be a combination of hardware, software, and/or firmware that is operable to receive signal information from the image sensor 12 and convert the signal information into a digital image.

In the illustrated example, the image sensor 12 includes an array 17 of unit cells 16. Each unit cell 16 accumulates charge proportional to the light intensity at its location in the field of view of the image sensor 12. Each unit cell 16 may correspond to a pixel in the captured electronic image. Each unit cell 16 may temporarily store the accumulated charge for use by the processing unit 14 to create an image. The stored charge, for example, may be converted into a voltage and the value of the voltage may be sampled by the processing unit 14 in order to digitize and store the value into some form of memory.

A particular method for image capture using the image capture device 10 may be rolling shutter capture. Rolling shutter capture is a method that captures each row of pixels from the image sensor 12 in order. For example, rolling shutter capture may expose the top row of pixels of the image sensor 12 to light, followed by the second row, followed by the third row, and so forth until the last row of pixels of the image sensor 12 is exposed to light. Another example of a method by which the image processing unit 14 may receive pixel information captured by image sensor 12 is ripple/rolling read. Rolling read is a method that processes each row of pixels from the image sensor 12 in order. Similar to rolling shutter capture, ripple read may process the top row of pixels of the image sensor 12, followed by the second row, followed by the third row, and so forth until the last row of pixels of the image sensor 12 is processed. A rolling reset operation to reset the rows of pixels of the image sensor 12 may be performed similarly.

The rolling shutter capture, rolling read, and rolling reset operations are typically performed on consecutive rows. For example, a rolling capture operation may begin with a first row of unit cells 16. As the rolling capture operation moves to the second row, a rolling read operation may begin on the first row of unit cells 16. After the rolling capture operation moves to the third row, the rolling read operation may begin on the second row and a rolling reset operation may begin on the first row. This may continue until the last row is processed. Once the last row is processed, the image may be processed and stored by the processing unit 14.

Although rolling based operations are described above for the capturing of an image using the image capture device 10, in other embodiments, the image capture device 10 may use a different image capture method. For example, in at least one embodiment, the image capture device utilizes a global shutter based method in which all the unit cells 16 in the image capture device 10 are configured to integrate flux at the same time.

Figure 2:
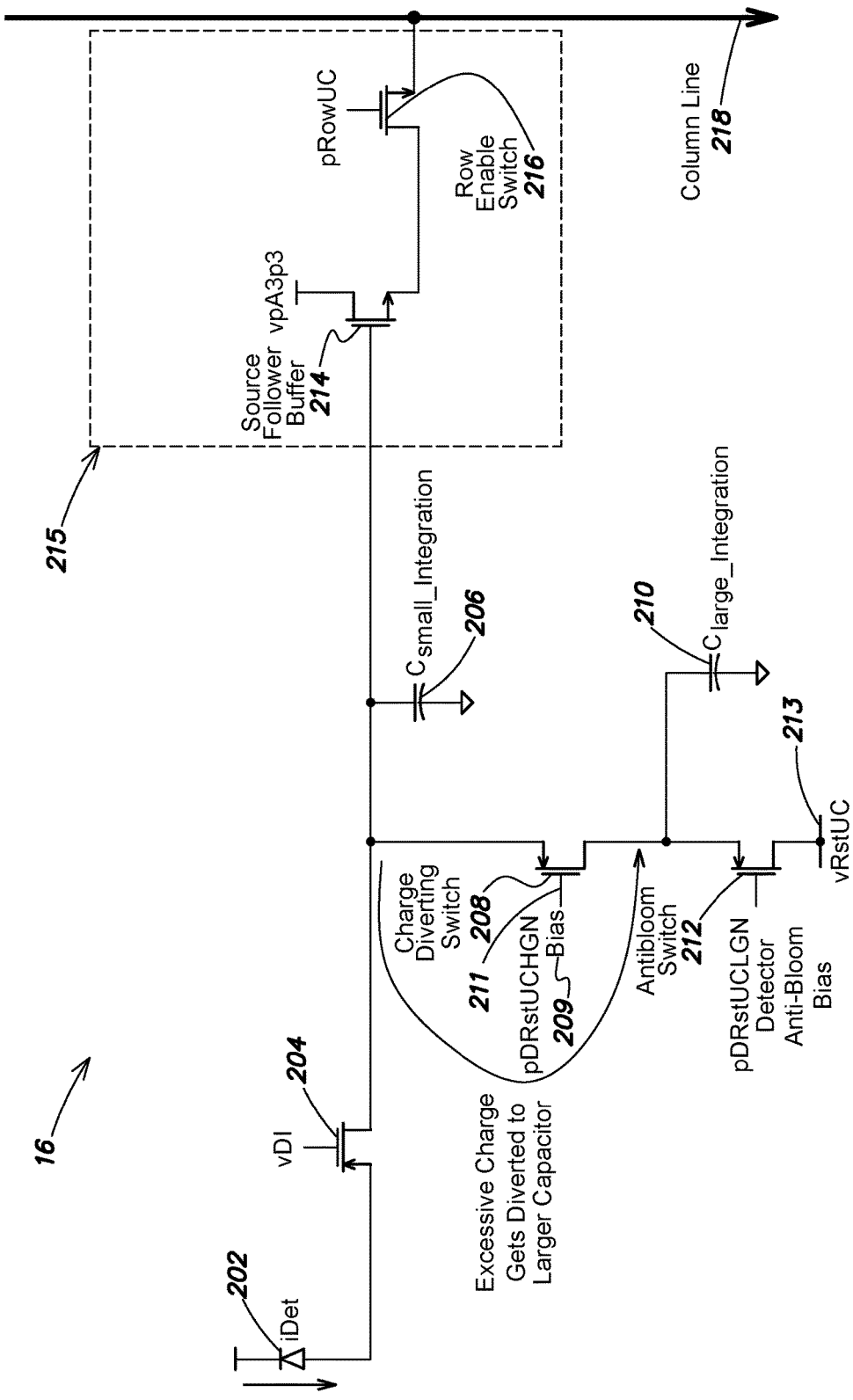
FIG. 2 is a schematic illustration of one example of a direct injection unit cell in accordance with aspects of the present invention.

FIG. 2 is a schematic illustration of one example of a direct injection unit cell 16 that may be included in the image sensor 12 and coupled to the image processing unit 14. The direction injection unit cell 16 includes a photodetector 202, an input transistor 204, a first integration capacitor ($C_{small\_Integration}$) 206, a charge diverting switch 208, a second integration capacitor ($C_{large\_Integration}$) 210, an antibloom switch 212, and read-out circuitry 215. According to one embodiment, the read-out circuitry 215 includes a source follower buffer 214 and a row enable switch 216. According to one embodiment, the photodetector 202 includes a photodiode.

In one embodiment, the input transistor 204 is a Metal-Oxide Semiconductor Field Effect Transistors (MOSFET); however, in other embodiments, the input transistor 204 may be any other appropriate type of switch or transistor. According to one embodiment, the switches in the unit cell 16 (i.e., the charge diverting switch 208, antibloom switch 212, source follower buffer 214, and row enable switch 216) are MOSFETs; however, in other embodiments, the switches 208, 212, 214, 216 in the unit cell 16 may be any other appropriate type of switch or transistor. According to one embodiment, a bias voltage 209 is applied to the gate 211 of the charge diverting switch 208. According to one embodiment, the capacitance of the first integration capacitor ($C_{small\_Integration}$) 206 is relatively small compared to the capacitance of the second integration capacitor ($C_{large\_Integration}$) 210. For example, in one embodiment, the first integration capacitor ($C_{small\_Integration}$) 206 is designed to a value of 10 femtofarads while the second integration capacitor ($C_{large\_Integration}$) 210 is designed to a value of 200 femtofarads so that the small integration capacitor can have a sensitivity that is twenty times larger than the large integration capacitor, and the large integration capacitor can contain twenty times the charge of the small integration capacitor. In another embodiment, the first integration capacitor ($C_{small\_Integration}$) 206 is designed to a value of 200 femtofarads while the second integration capacitor ($C_{large\_Integration}$) 210 is designed to a value of 2 picofarads. In other embodiments, the capacitance values of the first integration capacitor ($C_{small\_Integration}$) 206 and the second integration capacitor ($C_{large\_Integration}$) 210 can be designed to different appropriate values.

The anode of the photodetector 202 is coupled to the source of the input transistor 204. The drain of the input transistor 204 is coupled to the gate of the source follower buffer 214. The source of the charge diverting switch 208 is coupled to the drain of the input transistor 204. The drain of the charge diverting switch 208 is coupled to the source of the antibloom switch 212. The drain of the antibloom switch 212 is coupled to a reset voltage 213. A first terminal of the first integration capacitor ($C_{small\_Integration}$) 206 is coupled to the gate of the source follower buffer 214 and a second terminal of the first integration capacitor ($C_{small\_Integration}$) 206 is coupled to ground. A first terminal of the second integration capacitor ($C_{large\_Integration}$) 210 is coupled to the drain of the charge diverting switch 208 and a second terminal of the second integration capacitor ($C_{large\_Integration}$) 210 is coupled to ground. The source of the source follower buffer 214 is coupled to the drain of the row enable switch 216. The source of the row enable switch 216 is coupled to a column bus 218. Operation of the unit cell 16 is discussed below with reference to FIGS. 3-4B.

Figure 3:
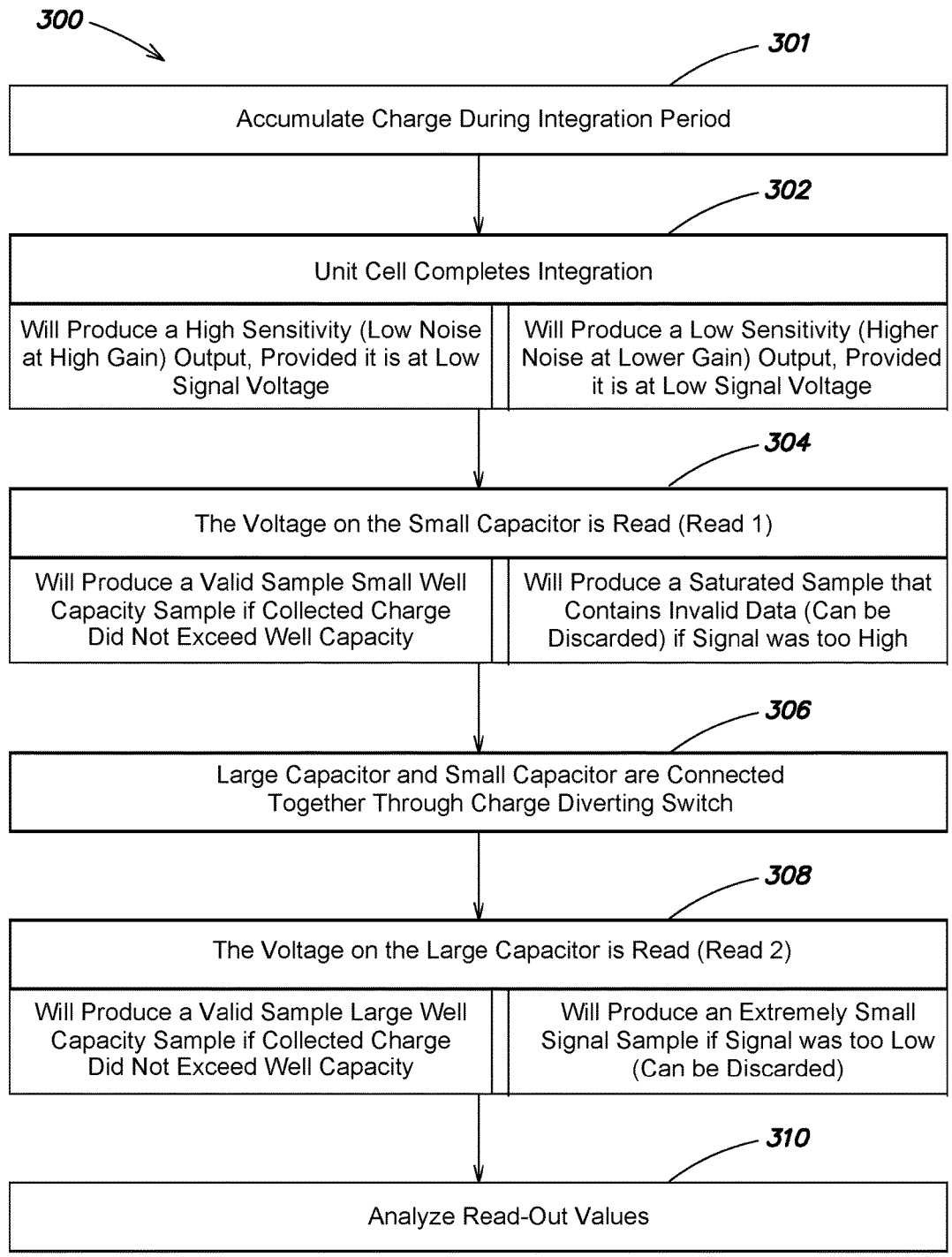
FIG. 3 is a flow chart illustrating operation of a unit cell in accordance with aspects of the present invention.
Figure 4A:
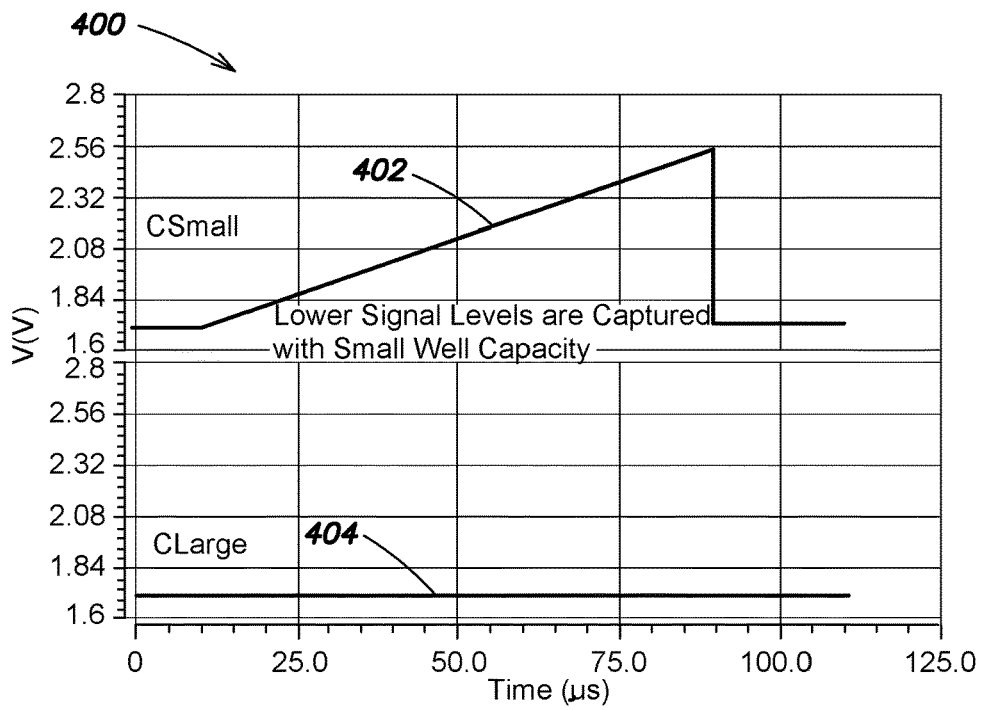
FIG. 4A is a graph illustrating different voltages of one embodiment of a unit cell in accordance with aspects of the present invention.
Figure 4B:
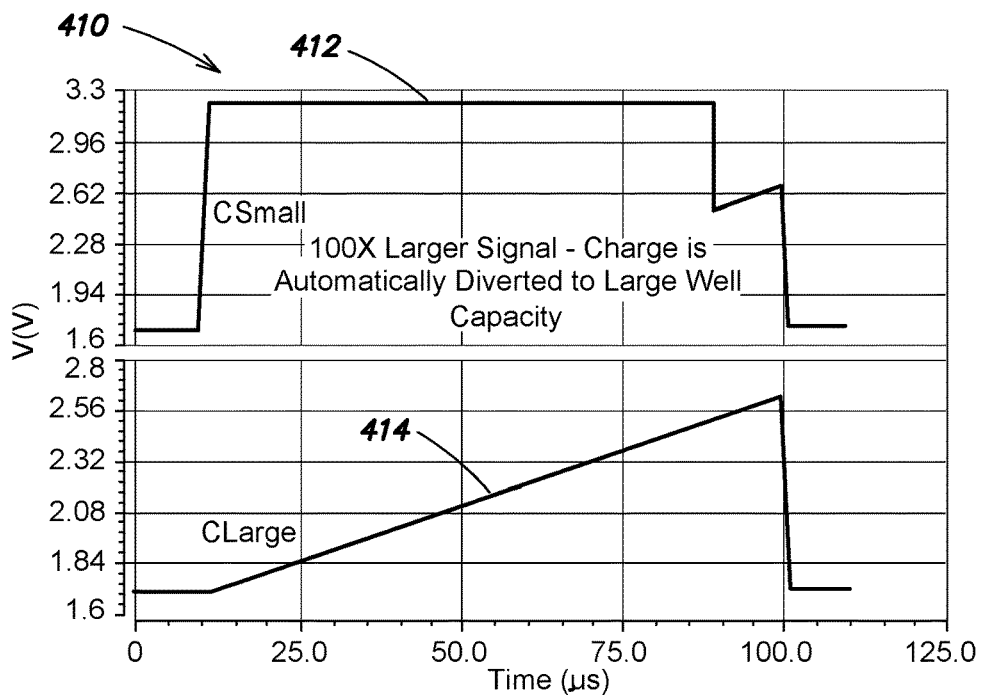
FIG. 4B is a graph illustrating different voltages of one embodiment of a unit cell in accordance with aspects of the present invention.

FIG. 3 is a flow chart illustrating operation of the unit cell 16. FIG. 4A is a graph 400 including a first trace 402 illustrating voltage across the first integration capacitor 206 over an integration period in a low ambient light situation and a second trace 404 illustrating voltage across the second integration capacitor 210 over the integration period in a low ambient light situation. FIG. 4B is a graph 410 including a first trace 412 illustrating voltage across the first integration capacitor 206 over an integration period in a high ambient light situation and a second trace 414 illustrating voltage across the second integration capacitor 210 over the integration period in a high ambient light situation.

Referring to FIG. 3, at block 301, as light (i.e., optical radiation) from a scene is incident on the photodetector 202, a resulting photocurrent from the photodetector 202 is provided, via the input transistor 204, to the first integration capacitor 206 and charge corresponding to the flux of the light incident on the photodetector 202 accumulates on the first integration capacitor 206. As charge accumulates on the first integration capacitor 206 during its integration period, the voltage across the first integration capacitor 206 increases.

As shown in FIG. 4A, in response to the voltage 402 across the first integration capacitor 206 remaining below a threshold voltage level (e.g., a bias voltage 209 applied to the gate 211 of the charge diverting switch 208), all of the charge generated during the integration period is stored on the first integration capacitor 206 (i.e., the voltage 404 on the second integration capacitor 210 remains at a reset level). As shown in FIG. 4B, in response to the voltage 412 across the first integration capacitor 206 exceeding the bias voltage 209 applied to the gate 211 of the charge diverting switch 208, excess charge is diverted to the second integration capacitor 210 and begins to accumulate on the second integration capacitor 210 (i.e., the voltage 412 on the first integration capacitor 206 is saturated and the voltage 414 on the second integration capacitor 210 starts increasing).

Referring again to FIG. 3, at block 302, the integration period of the unit cell 16 ends. Depending on the intensity of light incident on the photodetector 202, the output of the unit cell 16 will either be a high sensitivity (i.e., low noise at high gain) output (assuming that the first integration capacitor 206 has not saturated) that adequately differentiates between different low levels of electric charge accumulated on the unit cell 16 or a low sensitivity (i.e., higher noise at lower gain) output (assuming that the second integration capacitor 210 has not saturated) that adequately represents a relatively high level of electric charge accumulated on the unit cell 16.

More specifically, during the read-out process indicated at block 304, the voltage across the first integration capacitor 206 (i.e., a small well sample) is read-out. In one embodiment, to accomplish this read out, a controller (e.g., the image processing unit 14 shown in FIG. 1) transmits a control signal to the gate of the row enable switch 216. The control signal operates the row enable switch 216 to close, coupling the first integration capacitor 206 to the column bus 218 via the source follower buffer 214. Upon the row enable switch 216 closing, the voltage across the first integration capacitor 206 is read-out by the image processing unit 14. In response to the intensity of the light incident on the photodetector 202 being relatively low, the voltage (e.g., the voltage 402 shown in FIG. 4A) read-out from the first integration capacitor 206 is a valid representation of the intensity of the light incident on the photodiode as all of the generated charge is accumulated on the first integration capacitor 206 and the first integration capacitor 206 is not saturated. Alternatively, in response to the intensity of the light incident on the photodetector 202 being relatively high, the voltage (e.g., the voltage 412) read-out from the first integration capacitor 206 is not a valid representation of the intensity of the light incident on the photodiode as the first integration capacitor 206 is saturated and at least a portion of the generated charge is stored on the second integration capacitor 210. As discussed in greater detail below, the image processing unit 14 is configured to analyze the voltage read-out from the first integration capacitor 206 to determine whether the voltage is a valid or invalid representation of the intensity of the light incident on the photodiode.

At block 306 in FIG. 3, after the voltage on the first integration capacitor 206 is read out, the image processing unit 14 operates the charge diverting switch 208 to close, coupling the first integration capacitor 206 to the second integration capacitor 210 in parallel. Once the charge diverting switch 208 is closed, the voltage across the second integration capacitor 210 is read-out by a controller (e.g., the image processing unit 14 shown in FIG. 1) in block 308. In one embodiment, to read out the voltage across the second integration capacitor 210, the image processing unit 14 transmits a control signal to the gate of the row enable switch 216. The control signal operates the row enable switch 216 to close, coupling the second integration capacitor 210 to the column bus 218 via the source follower buffer 214. Upon the row enable switch 216 being closed, the voltage across the second integration capacitor 210 (i.e., a large well sample) is read-out by the image processing unit 14. According to one embodiment, a control signal is provided to the row enable switch 216 to maintain the row enable switch 216 in a consistently closed state while both the voltage on the first integration capacitor 206 and the voltage on the second integration capacitor 210 are read out (i.e., the row enable switch 216 is closed between blocks 304 and 306). Alternatively, in another embodiment, the control signal provided to the row enable switch may operate the row enable switch 216 to open between the voltage on the first integration capacitor 206 and the voltage on the second integration capacitor 210 being read out (i.e., the row enable switch 216 is open between blocks 304 and 306).

In response to the intensity of the light incident on the photodetector 202 being relatively low, the voltage (e.g., the voltage 404 shown in FIG. 4A) read-out from the second integration capacitor 210 is not a valid representation of the intensity of the light incident on the photodetector 202 as all of the generated charge is accumulated on the first integration capacitor 206 and charge was not diverted to the second integration capacitor 210 (i.e., the voltage 404 across the second integration capacitor 210 remains at the relatively small reset value). Alternatively, in response to the intensity of the light incident on the photodetector 202 being relatively high, the voltage (e.g., the voltage 414) read-out from the second integration capacitor 210 is a valid representation of the intensity of the light incident on the photodiode as the first integration capacitor 206 is saturated and the excess charge was diverted to the second integration capacitor 210. As discussed in greater detail below, the image processing unit 14 is configured to analyze the voltage read-out from the second integration capacitor 210 to determine whether the voltage is a valid or invalid representation of the intensity of the light incident on the photodiode.

At block 310, the image processing unit 14 analyzes the voltage read-out from the first integration capacitor 206 and the voltage read-out from the second integration capacitor 210 to determine whether either read-out voltage is invalid. For example, in at least one embodiment, the image processing unit 14 determines that the voltage read-out from the first integration capacitor 206 is invalid if the voltage indicates that the first integration capacitor 206 was saturated (e.g., as shown by the voltage trace 412 of FIG. 4B). In another embodiment, the image processing unit 14 determines that the voltage read-out from the second integration capacitor 210 is invalid if the voltage is relatively small (e.g., at a relatively small reset value).

According to one embodiment, in response to identifying that the voltage read-out from the first integration capacitor 206 is invalid (e.g., because the read-out value is saturated), the image processing unit 14 discards the information read-out from the first integration capacitor 206 and utilizes the information read-out from the second integration capacitor 210 for further image processing, such as in bright ambient light situations. Conversely, in response to identifying that the voltage read-out from the second integration capacitor 210 is invalid (e.g., because the read-out value is substantially at a reset level), the image processing unit 14 discards the information read-out from the second integration capacitor 210 and utilizes the information read-out from the first integration capacitor 206 for further image processing, such as in low ambient light situations. In another embodiment, the image processing unit 14 can utilize both the information read out from the first integration capacitor 206 and the information read out from the second integration capacitor 210 for further image processing. This may be useful if the local circuitry (e.g., the image processing unit 14) cannot make a decision on which sample to keep. It may also be useful for sensor calibration.

According to at least one embodiment, the analysis of the information read out from the first integration capacitor 206 and the information read out from the second integration capacitor 210 is performed by the image processing unit 14 after both the voltage across the first integration capacitor 206 and the voltage across the second integration capacitor 210 are read-out. However, in at least one embodiment, the image processing unit 14 can analyze the voltage across the first integration capacitor 206 and/or the voltage across the second integration capacitor 210 immediately upon the voltages being read-out.

After both the voltage across the first integration capacitor 206 and the voltage across the second integration capacitor 210 are read-out from the unit cell 16, the image processing unit 14 transmits a signal to the antibloom switch 212 to operate the switch 212 to close. Once the antibloom switch 212 is closed, the first integration capacitor 206 (via the charge diverting switch 208) and the second integration capacitor 210 are coupled to the reset voltage 213 such that voltage level across each capacitor 206, 210 is reset to the reset voltage level 213. Upon the integration capacitors 206, 210 being reset, the image processing unit 14 transmits a signal to the antibloom switch 212 to open and a signal to the charge diverting switch 208 to open, and charge corresponding to light incident on the photodetector 202 can again accumulate on the first integration capacitor 206.

By diverting excess charge to the second (larger) integration capacitor rather than losing the excess charge once the first (smaller) integration capacitor is saturated, the unit cell 16 is optimized for two different applications (i.e., low and high ambient light applications) with a single integration period and the dynamic range of the unit cell 16 is increased. In one embodiment, the dynamic range of the unit cell can be increased by more than 100 times. As discussed above, the unit cell 16 includes two capacitors (i.e., a relatively small first integration capacitor 206 and a relatively large second integration capacitor 210); however, in other embodiments, the unit cell 16 can include more than two capacitors to extend the dynamic range of the unit cell 16 even more.

Figure 5:
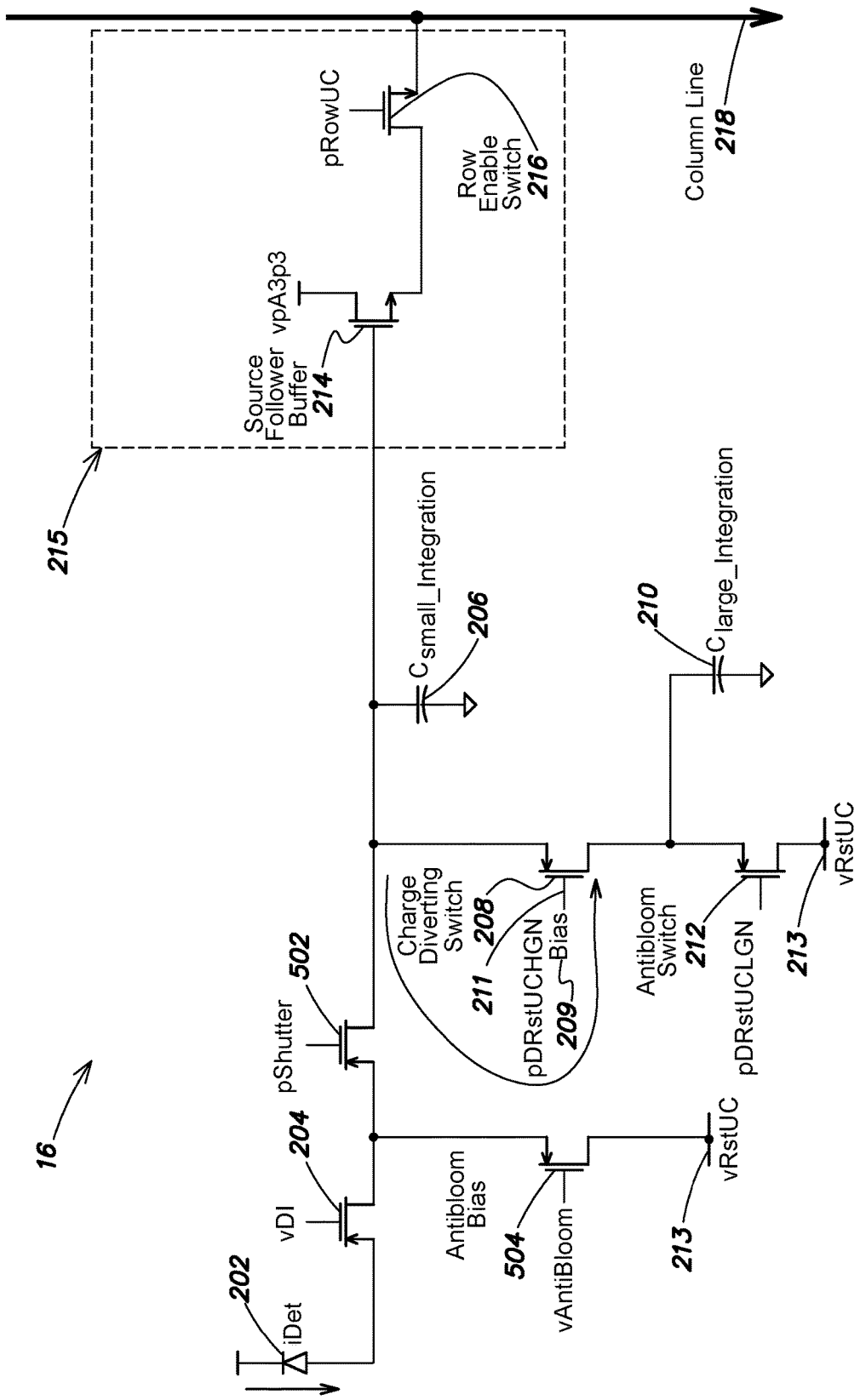
FIG. 5 is a schematic diagram of another embodiment of a unit cell in accordance with aspects of the present invention.

As described above, the unit cell 16 can be operated in a "rolling shutter" mode of operation where the collection of charge can continue as information is read out from the integration capacitors 206, 210 (i.e., the information is read-out in "real-time"). However, in other embodiments, the unit cell 16 can be configured to operate in a different mode of operation. For example, the unit cell 16 can be configured and operated in an "integrate-then-read" mode of operation. For example, FIG. 5 is a schematic diagram of a unit cell 16 configured to operate in a "global shutter integrate-then-read" mode of operation. The unit cell 16 shown in FIG. 5 is substantially the same as the unit cell 16 shown in FIG. 2, except that the unit cell 16 shown in FIG. 5 includes a shutter switch 502 and an antibloom bias switch 504. In one embodiment, the shutter switch 502 and the antibloom bias switch 504 are MOSFETs; however, in other embodiments, the shutter switch 502 and the antibloom bias switch 504 may be any other appropriate type of switch or transistor.

The source of the shutter switch 502 is coupled to the drain of the input transistor 204 and the drain of the shutter switch 502 is coupled to the gate of the source follower buffer 214. The source of the antibloom bias switch 504 is coupled to the drain of the input transistor 204 and the drain of the antibloom bias switch 504 is coupled to the reset voltage 213.

Figure 6:
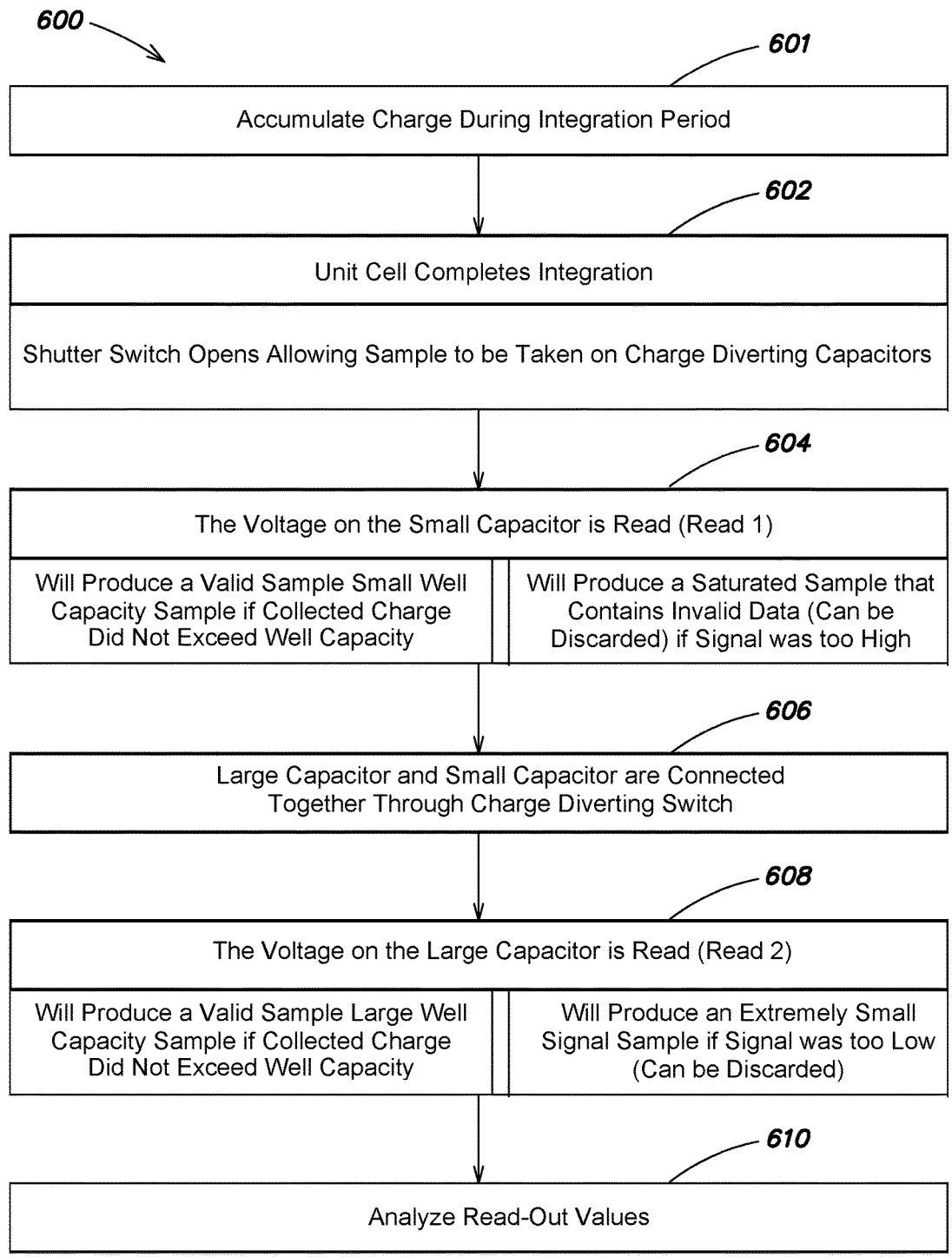
FIG. 6 is a flow chart illustrating operation of a unit cell in accordance with aspects of the present invention.

The unit cell 16 shown in FIG. 5 operates in substantially the same way as the unit cell 16 shown in FIG. 2 except that rather than continuing to integrate charge while information is being read out from the unit cell 16, the unit cell 16 of FIG. 5 operates to first integrate charge and then subsequently stop integrating charge while its stored integration values are read out. For example, operation of the unit cell 16 shown in FIG. 5 is discussed in greater detail below with respect to FIG. 6. FIG. 6 is a flow chart illustrating operation of the unit cell 16 shown in FIG. 5.

At block 601, as light from a scene is incident on the photodetector 202, a resulting photocurrent from the photodetector 202 is provided, via the input transistor 204 and the closed shutter switch 502, to the first integration capacitor 206, and charge corresponding to the flux of the light incident on the photodetector 202 accumulates on the first integration capacitor 206 during its integration capacitor. As charge accumulates on the first integration capacitor 206, the voltage across the first integration capacitor 206 increases. In response to the voltage across the first integration capacitor 206 remaining below a bias voltage 209 applied to the gate 211 of the charge diverting switch 208, all of the accumulated charge during the integration period is stored on the first integration capacitor 206 (i.e., the voltage on the second integration capacitor 210 remains at a reset level). In response to the voltage across the first integration capacitor 206 exceeding the bias voltage applied to the gate of the charge diverting switch 208, excess charge is diverted to the second integration capacitor 210 and begins to accumulate on the second integration capacitor 210 (i.e., the voltage on the first integration capacitor 206 is saturated and the voltage on the second integration capacitor 210 starts increasing).

At block 602, at the end of the unit cell integration period, a controller (e.g., the image processing unit 14) operates the shutter switch 502 to open, decoupling the first integration capacitor 206 from the photodetector 202, and a read-out process of the unit cell 16 is started. Depending on the intensity of light incident on the photodetector 202, the output of the unit cell 16 will either be a high sensitivity (i.e., low noise at high gain) output (assuming that the first integration capacitor 206 has not saturated) that adequately differentiates between different low levels of electric charge accumulated on the unit cell or a low sensitivity (i.e., higher noise at lower gain) output (assuming that the second integration capacitor 210 has not saturated) that adequately represents a relatively high level of electric charge accumulated on the unit cell.

More specifically, during the read-out process indicated at block 604, the voltage across the first integration capacitor 206 is read-out. In one embodiment, to accomplish this read out, a controller (e.g., the image processing unit 14 shown in FIG. 1) transmits a control signal to the gate of the row enable switch 216. The control signal operates the row enable switch 216 to close, coupling the first integration capacitor 206 to the column bus 218 via the source follower buffer 214. Upon the row enable switch 216 closing, the voltage across the first integration capacitor 206 (i.e., a small well sample) is read-out by the image processing unit 14. In response to the intensity of the light incident on the photodetector 202 being relatively low, the voltage read-out from the first integration capacitor 206 is a valid representation of the intensity of the light incident on the photodiode as all of the generated charge is accumulated on the first integration capacitor 206 and the first integration capacitor 206 is not saturated. Alternatively, in response to the intensity of the light incident on the photodetector 202 being relatively high, the voltage read-out from the first integration capacitor 206 is not a valid representation of the intensity of the light incident on the photodiode as the first integration capacitor 206 is saturated and at least a portion of the generated charge is stored on the second integration capacitor 210. As discussed in greater detail below, the image processing unit 14 is configured to analyze the voltage read-out from the first integration capacitor 206 to determine whether the voltage is a valid or invalid representation of the intensity of the light incident on the photodiode.

At block 606 in FIG. 6, after the voltage on the first integration capacitor 206 is read out, the image processing unit 14 operates the charge diverting switch 208 to close, coupling the first integration capacitor 206 to the second integration capacitor 210 in parallel. Once the charge diverting switch 208 is closed, the voltage across the second integration capacitor 210 (i.e., a large well sample) is read-out by a controller (e.g., the image processing unit 14 shown in FIG. 1) at block 608. In one embodiment, to read out the voltage across the second integration capacitor 210, the image processing unit 14 transmits a control signal to the gate of the row enable switch 216. The control signal operates the row enable switch 216 to close, coupling the second integration capacitor 210 to the column bus 218 via the source follower buffer 214. Upon the row enable switch 216 being closed, the voltage across the second integration capacitor 210 is read-out by the image processing unit 14. In response to the intensity of the light incident on the photodetector 202 being relatively low, the voltage read-out from the second integration capacitor 210 is not a valid representation of the intensity of the light incident on the photodetector 202 as all of the generated charge is accumulated on the first integration capacitor 206 and charge was not diverted to the second integration capacitor 210 (i.e., the voltage across the second integration capacitor 210 remains at the relatively small reset value). Alternatively, in response to the intensity of the light incident on the photodetector 202 being relatively high, the voltage read-out from the second integration capacitor 210 is a valid representation of the intensity of the light incident on the photodiode as the first integration capacitor 206 is saturated and the excess charge was diverted to the second integration capacitor 210. As discussed in greater detail below, the image processing unit 14 is configured to analyze the voltage read-out from the second integration capacitor 210 to determine whether the voltage is a valid or invalid representation of the intensity of the light incident on the photodiode.

At block 610, the image processing unit 14 analyzes the voltage read-out from the first integration capacitor 206 and the voltage read-out from the second integration capacitor 210, as similarly discussed above, to determine whether either read-out voltage is invalid. After both the voltage across the first integration capacitor 206 and the voltage across the second integration capacitor 210 are read-out from the unit cell 16, the image processing unit 14 transmits a signal to the antibloom switch 212 and to the antibloom bias switch 504 to operate the switches 212, 504 to close. Once the antibloom switch 212 and antibloom bias switch 504 are closed, the first integration capacitor 206 (via the charge diverting switch 208), the second integration capacitor 210, and the source of the shutter switch 502 are coupled to the reset voltage 213 such that voltage level across each capacitor 206, 210 and the voltage at the source of the shutter switch 502 is reset to the reset voltage level 213. Upon the voltages being reset, the image processing unit 14 transmits a signal to the antibloom switch 212 to open, a signal to the shutter switch 502 to close, and a signal to the charge diverting switch 208 to open, and charge corresponding to light incident on the photodetector 202 can again accumulate on the first integration capacitor 206.

Figure 7:
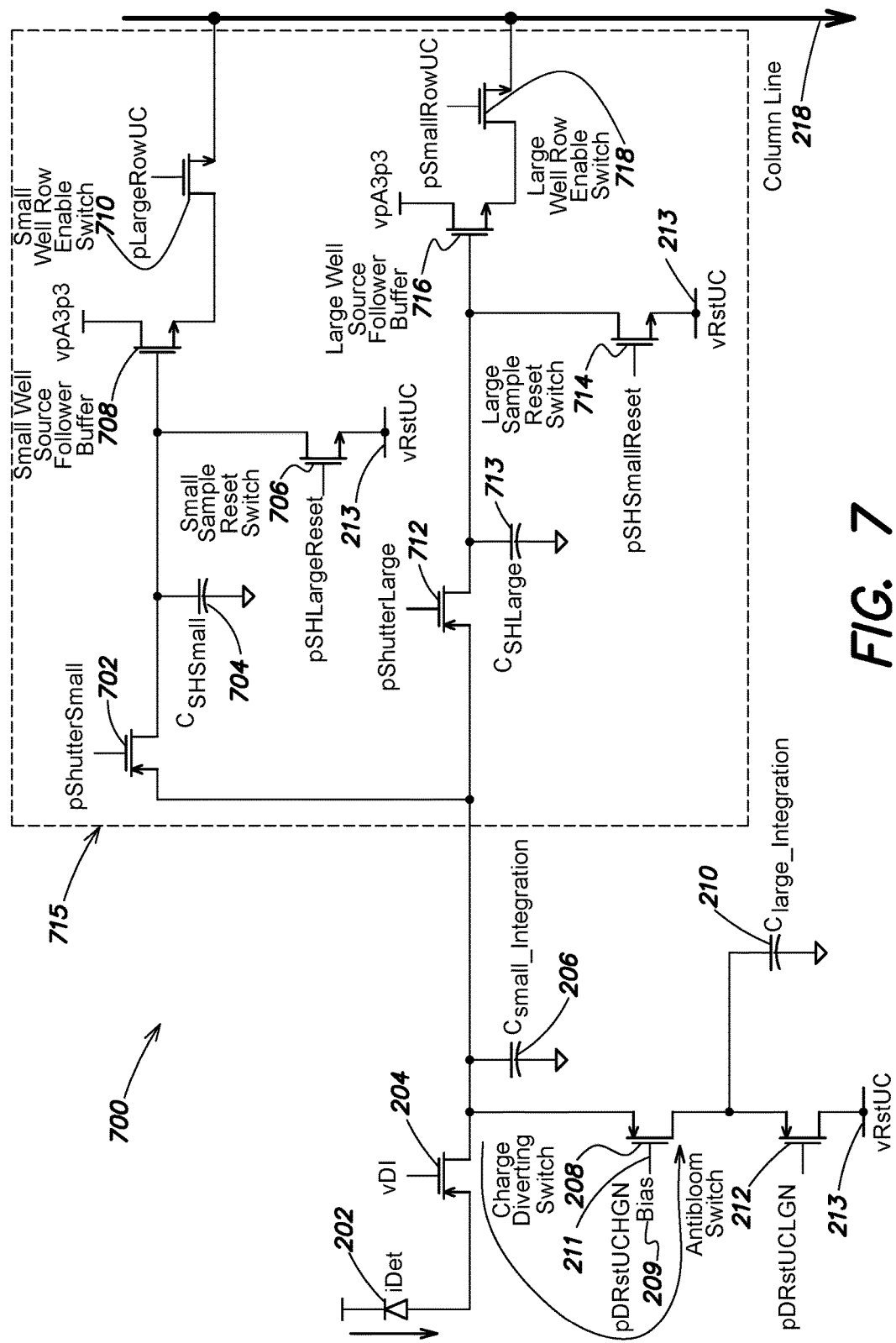
FIG. 7 is a schematic diagram of another embodiment of a unit cell in accordance with aspects of the present invention.

According to another embodiment, the unit cell 16 can be configured and operated in an "integrate-while-read" mode of operation. For example, FIG. 7 is a schematic diagram of a unit cell 16 configured to operate in an "integrate-while-read" mode of operation. The unit cell 16 shown in FIG. 7 is substantially the same as the unit cell 16 shown in FIG. 2, except that the unit cell 16 shown in FIG. 7 includes additional read-out circuitry 715. The read-out circuitry 715 of the unit cell 16 shown in FIG. 7 includes a small shutter switch 702, a small shutter capacitor 704, a small sample reset switch 706, a small well source follower buffer 708, a small well row enable switch 710, a large shutter switch 712, a large shutter capacitor 713, a large sample reset switch 714, a large well source follower buffer 716, and a large well row enable switch 718. In one embodiment, the small shutter switch 702, small sample reset switch 706, small well source follower buffer 708, small well row enable switch 710, large shutter switch 712, large sample reset switch 714, large well source follower buffer 716, and large well row enable switch 718 are MOSFETs; however, in other embodiments, the small shutter switch 702, small sample reset switch 706, small well source follower buffer 708, small well row enable switch 710, large shutter switch 712, large sample reset switch 714, large well source follower buffer 716, or large well row enable switch 718 may be any other appropriate type of switch or transistor.

The source of the small shutter switch 702 is coupled to the first integration capacitor 206. The drain of the small shutter switch 702 is coupled to a gate of the small well source follower buffer 708. A first terminal of the small shutter capacitor 704 is coupled to the drain of the small shutter switch 702. A second terminal of the small shutter capacitor 704 is coupled to ground. The drain of the small sample reset switch 706 is coupled to the gate of the small well source follower buffer 708. The source of the small sample reset switch 706 is coupled to the reset voltage 213. The source of the small well source follower buffer 708 is coupled to the drain of the small well row enable switch 710 and the source of the small well row enable switch 710 is coupled to the column bus 218.

The source of the large shutter switch 712 is coupled to the first integration capacitor 206. The drain of the large shutter switch 712 is coupled to a gate of the large well source follower buffer 716. A first terminal of the large shutter capacitor 713 is coupled to the drain of the large shutter switch 712. A second terminal of the large shutter capacitor 713 is coupled to ground. The drain of the large sample reset switch 714 is coupled to the gate of the large well source follower buffer 716. The source of the large sample reset switch 714 is coupled to the reset voltage 213. The source of the large well source follower buffer 716 is coupled to the drain of the large well row enable switch 718 and the source of the large well row enable switch 718 is coupled to the column bus 218. According to one embodiment, the capacitance value of the small shutter capacitor 704 is the same as the capacitance value of the large shutter capacitor 713. For example, in one embodiment, the capacitance value of both the small shutter capacitor 704 and the large shutter capacitor 713 is 100 femtofarads when the capacitance value of the first integration capacitor ($C_{small\_Integration}$) 206 is 200 femtofarads and the capacitance value of the second integration capacitor ($C_{large\_Integration}$) 210 is 2 picofarads. In other embodiments, the capacitance values of the small shutter capacitor 704 and the large shutter capacitor 713 can be designed to different appropriate values. For example, according to another embodiment, the capacitance value of the small shutter capacitor 704 is designed to be different than the capacitance value of the large shutter capacitor 713.

Figure 8:
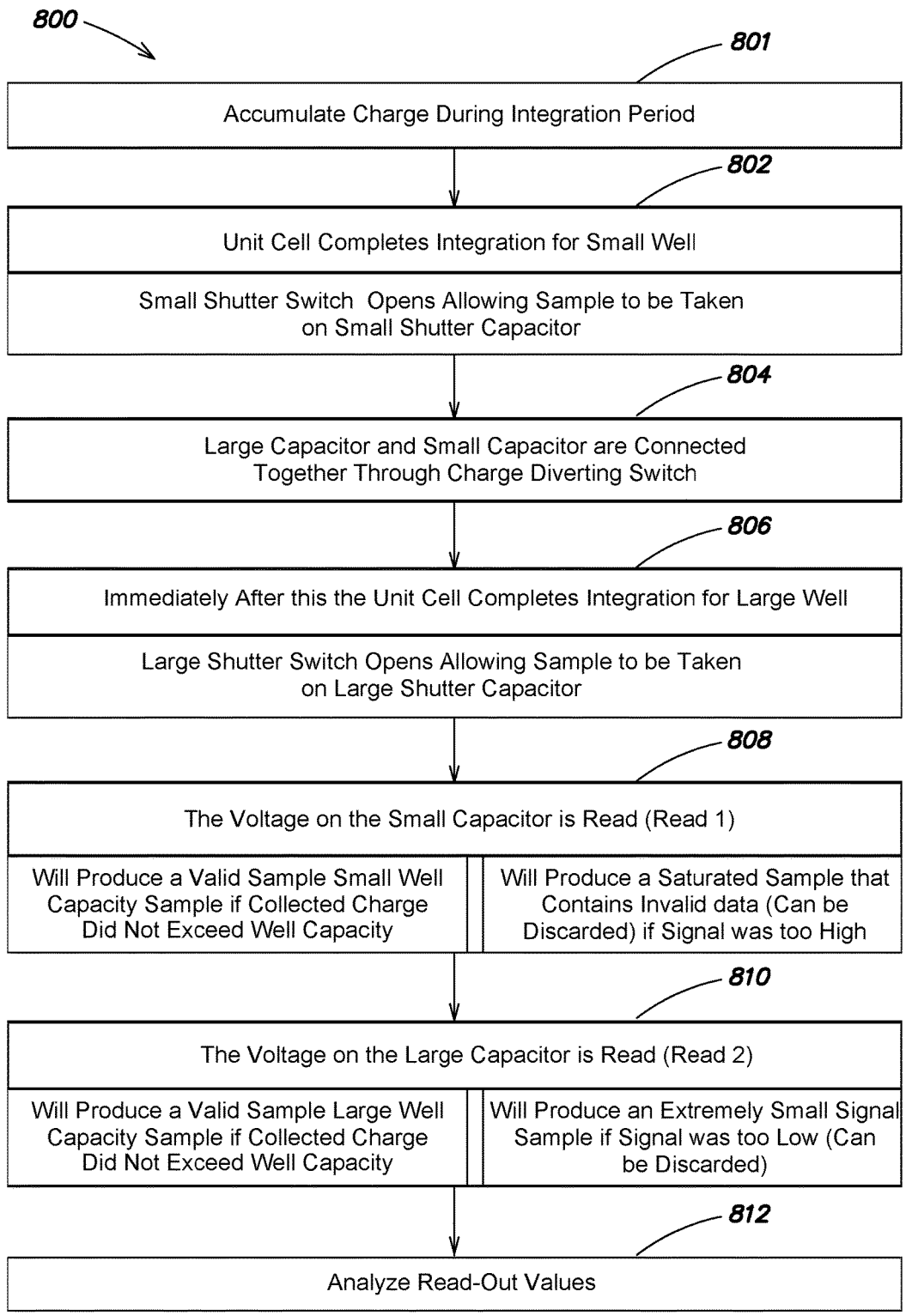
FIG. 8 is a flow chart illustrating operation of a unit cell in accordance with aspects of the present invention.

The unit cell 16 shown in FIG. 7 operates in substantially the same way as the unit cell 16 shown in FIG. 2 except that the unit cell 16 shown in FIG. 7 includes additional read-out circuitry 715. For example, operation of the unit cell 16 shown in FIG. 7 is discussed in greater detail below with respect to FIG. 8. FIG. 8 is a flow chart illustrating operation of the unit cell 16 shown in FIG. 7.

At block 801, as light from a scene is incident on the photodetector 202, a resulting photocurrent from the photodetector 202 is provided, via the input transistor 204, to the first integration capacitor 206 and charge corresponding to the flux of the light incident on the photodetector 202 accumulates on the first integration capacitor 206 during its integration period. As charge accumulates on the first integration capacitor 206, the voltage across the first integration capacitor 206 increases. In response to the voltage across the first integration capacitor 206 remaining below a bias voltage 209 applied to the gate 211 of the charge diverting switch 208, all of the accumulated charge during the integration period is stored on the first integration capacitor 206 (i.e., the voltage on the second integration capacitor 210 remains at a reset level). In response to the voltage across the first integration capacitor 206 exceeding the bias voltage 209 applied to the gate 211 of the charge diverting switch 208, excess charge is diverted to the second integration capacitor 210 and begins to accumulate on the second integration capacitor 210 (i.e., the voltage on the first integration capacitor 206 is saturated and the voltage on the second integration capacitor 210 starts increasing).

At block 802, at the end of a first integration period, a controller (e.g., the image processing unit 14) operates the small shutter switch 702 to open, decoupling the small shutter capacitor 704 from the first integration capacitor 206 and storing a charge sample on the small shutter capacitor 704 corresponding to the charge stored on the first integration capacitor 206.

At block 804, the image processing unit 14 operates the charge diverting switch 208 to close, coupling the first integration capacitor 206 to the second integration capacitor 210 in parallel. At block 806, at the end of a second integration period, the image processing unit 14 operates the large shutter switch 712 to open, decoupling the large shutter capacitor 713 from the first integration capacitor 206 and the second integration capacitor 210 and storing a charge sample on the large shutter capacitor 713 corresponding to the charge stored on the combined first and second integration capacitors 206, 210.

At block 808, a read-out process of the small shutter capacitor 704 is started. More specifically, during the read-out process indicated at block 808, the voltage across the small shutter capacitor 704 (i.e., a small well sample) is read-out. In one embodiment, to accomplish this read out, a controller (e.g., the image processing unit 14 shown in FIG. 1) transmits a control signal to the gate of the small well row enable switch 720. The control signal operates the small well row enable switch 720 to close, coupling the small shutter capacitor 704 to the column bus 218 via the small well source follower buffer 708. Upon the small well row enable switch 710 closing, the voltage across the small shutter capacitor 704 is read-out by the image processing unit 14. In response to the intensity of the light incident on the photodetector 202 being relatively low, the voltage read-out from the small shutter capacitor 704 is a valid representation of the intensity of the light incident on the photodiode as all of the generated charge is accumulated on the first integration capacitor 206 (and subsequently the small shutter capacitor 704) and the first integration capacitor 206 is not saturated. Alternatively, in response to the intensity of the light incident on the photodetector 202 being relatively high, the voltage read-out from the small shutter capacitor 704 is not a valid representation of the intensity of the light incident on the photodiode as the first integration capacitor 206 (and subsequently the small shutter capacitor 704) is saturated and at least a portion of the generated charge is stored on the second integration capacitor 210. As discussed in greater detail below, the image processing unit 14 is configured to analyze the voltage read-out from the small shutter capacitor 704 to determine whether the voltage is a valid or invalid representation of the intensity of the light incident on the photodiode.

At block 810 in FIG. 8, a read-out process of the large shutter capacitor 713 is started. More specifically, during the read-out process indicated at block 810, the voltage across the large shutter capacitor 713 (i.e., a large well sample) is read-out. In one embodiment, to read out the voltage across the large shutter capacitor 713, a controller (e.g., the image processing unit 14 shown in FIG. 1) transmits a control signal to the gate of the large well row enable switch 718. The control signal operates the large well row enable switch 718 to close, coupling the large shutter capacitor 713 to the column bus 218 via the large well source follower buffer 716. Upon the large well row enable switch 718 closing, the voltage across the large shutter capacitor 713 is read-out by the image processing unit 14. In response to the intensity of the light incident on the photodetector 202 being relatively low, the voltage read-out from the large shutter capacitor 713 is not a valid representation of the intensity of the light incident on the photodetector 202 as all of the generated charge is accumulated on the first integration capacitor 206 and charge was not diverted to the second integration capacitor 210 (i.e., the voltage across the second integration capacitor 210, and hence the large shutter capacitor 713, remains relatively small). Alternatively, in response to the intensity of the light incident on the photodetector 202 being relatively high, the voltage read-out from the large shutter capacitor 713 is a valid representation of the intensity of the light incident on the photodiode as the first integration capacitor 206 is saturated and the excess charge was diverted to the second integration capacitor 210. As discussed in greater detail below, the image processing unit 14 is configured to analyze the voltage read-out from the large shutter capacitor 713 to determine whether the voltage is a valid or invalid representation of the intensity of the light incident on the photodiode.

At block 812, the image processing unit 14 analyzes the voltage read-out from the small shutter capacitor 704 and the voltage read-out from the large shutter capacitor 713, as similarly discussed above with respect to voltages read out from the first integration capacitor 206 and the second integration capacitor 210, to determine whether either read-out voltage is invalid.

Once the small shutter switch 702 and the large shutter switch 712 are opened (and while the voltages across the small shutter capacitor 704 and the large shutter capacitor 713 are being read out), the unit cell 16 shown in FIG. 7 cam again integrate charge. More specifically, once the small shutter switch 702 and the large shutter switch 712 are opened, the image processing unit 14 transmits a signal to the antibloom switch 212 to close. Once the antibloom switch 212 is closed, the first integration capacitor 206 (via the charge diverting switch 208) and the second integration capacitor 210 are coupled to the reset voltage 213 such that voltage level across each capacitor 206, 210 is reset to the reset voltage level 213. Upon the voltages being reset, the image processing unit 14 transmits a signal to the antibloom switch 212 to open and charge corresponding to light incident on the photodetector 202 can again accumulate on the first integration capacitor 206. Accordingly, charge can again accumulate on the first integration capacitor 206 while samples from the previous integration period are read out from the small shutter capacitor 704 and the large shutter capacitor 713.

After voltage samples are read out from the small shutter capacitor 704 and the large shutter capacitor 713, the image processing unit 14 transmits a signal to the small sample reset switch 706 and the large sample reset switch 714 to close. Once the small sample reset switch 706 and the large sample reset switch 714 are closed, the small shutter capacitor 704 and the large shutter capacitor 713 are coupled to the reset voltage 213 such that the voltage across each capacitor 704, 713 is reset to the reset voltage level 213. Upon the voltages being reset, the image processing unit 14 transmits a signal to the small sample reset switch 706 and the large sample reset switch 714 to open. Once the small sample reset switch 706 and the large sample reset switch 714 are open, the image processing unit 14 can again transmit a signal to the small shutter switch 702 and the large shutter switch 712 to close such that the small shutter capacitor 704 and the large shutter capacitor 713 are coupled to the first integration capacitor 206.

The image processing unit 14 can read out voltage samples from each unit cell 16 in the image sensor 12 as described above and utilize the voltage samples to generate a digital image of the scene viewed by the image sensor 12. According to at least one embodiment, the image processing unit 14 is configured to individually analyze (e.g., as described above) the small well sample and the large well sample of each unit cell 16. However, according to at least one embodiment, the image processing unit 14 is configured to analyze a full small well sample from the entire array of unit cells 16 in the image sensor 12 and full large well sample from the entire array of unit cells 16 in the image sensor 12.

As described above, switches of the unit cell 16 can be operated by the image processing unit 14; however, in other embodiments, each unit cell 16 can be operated by any number of different controllers.

The high dynamic range direct injection unit cell circuit described herein is configured to divert excess charge to a relatively large integration capacitor, rather than losing the excess charge once a smaller integration capacitor is saturated. Accordingly, the unit cell circuit described herein is optimized for two different applications (i.e., low and high ambient light applications) with a single integration period and a high dynamic range.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A unit cell circuit comprising:
    a photodetector configured to generate a photo-current in response to receiving light;
    a first integration capacitor coupled to the photodetector and configured to accumulate charge corresponding to the photo-current;
    a second integration capacitor configured to accumulate charge corresponding to the photo-current;
    a charge diverting switch coupled to the photodetector and configured to selectively couple the first integration capacitor to the second integration capacitor and divert the photo-current to the second integration capacitor in response to a voltage across the first integration capacitor exceeding a threshold voltage level;
    read-out circuitry coupled to the first integration capacitor and the charge diverting switch and configured to read-out a first voltage sample from the first integration capacitor corresponding to charge accumulated on the first integration capacitor and to read-out a second voltage sample from the second integration capacitor corresponding to charge accumulated on the second integration capacitor; and
    an image processor coupled to the charge diverting switch and the read-out circuitry,
    wherein in a first mode of operation, the image processor is configured to operate the read-out circuitry to provide the first voltage sample to the image processor,
    wherein in a second mode of operation, the image processor is configured to operate the charge diverting switch to close, coupling the first integration capacitor to the second integration capacitor, and to operate the read-out circuitry to provide the second voltage sample to the image processor, and
    wherein the image processor is further configured to analyze the first voltage sample and the second voltage sample to determine whether either one of the first voltage sample and the second voltage sample is invalid.

2. The unit cell circuit of claim 1, wherein the charge diverting switch is a MOSFET and the threshold voltage level is defined by a bias voltage received by a gate of the charge diverting switch.

3. The unit cell circuit of claim 1, wherein a capacitance value of the second integration capacitor is at least twenty times larger than a capacitance value of the first integration capacitor.

4. The unit cell circuit of claim 1, further comprising a shutter switch coupled between the photodiode and the first integration capacitor and configured to open when the read-out circuitry is reading-out the first voltage sample and the second voltage sample.

5. The unit cell circuit of claim 1, wherein the image processor is further configured to determine that the first voltage sample is invalid in response to identifying that the first voltage sample indicates a saturated first integration capacitor.

6. The unit cell circuit of claim 1, wherein the image processor is further configured to determine that the second voltage sample is invalid in response to identifying that the second voltage sample is substantially at a reset level.

7. The unit cell circuit of claim 1, wherein the read-out circuit comprises:
    a buffer coupled to the first integration capacitor; and
    a row enable switch coupled to the buffer and to the image processor,
    wherein, in the first and second modes of operation, the image processor is further configured to operate the row enable switch to couple the buffer to the image processor.

8. The unit cell circuit of claim 1, wherein the read-out circuit comprises:
    a first shutter switch coupled to the first integration capacitor;
    a first shutter capacitor selectively coupled to the first shutter switch;
    a first buffer coupled to the first shutter capacitor; and
    a first row enable switch coupled to the first buffer,
    wherein, in the first mode of operation, the image processor is further configured to operate the first shutter switch to open such that the first voltage sample is stored on the first shutter capacitor.

9. The unit cell circuit of claim 8, wherein the read-out circuit comprises:
    a second shutter switch coupled to the first integration capacitor;
    a second shutter capacitor selectively coupled to the second shutter switch;
    a second buffer coupled to the second shutter capacitor; and
    a second row enable switch coupled to the second buffer,
    wherein, in the second mode of operation, the image processor is further configured to operate the second shutter switch to open such that the second voltage sample is stored on the second shutter capacitor.

10. The unit cell circuit of claim 9, wherein in the first mode of operation, the image processor is further configured to operate the first row enable switch to couple the first buffer to the image processor, and
    wherein in the second mode of operation, the image processor is further configured to operate the second row enable switch to couple the second buffer to the image processor.

11. A method for operating a unit cell circuit comprising a photodetector, a first integration capacitor coupled to the photodetector, a charge diverting switch coupled to the photodetector, a second integration capacitor coupled to the charge diverting switch, and read-out circuitry coupled to the first integration capacitor and the charge diverting switch, the method comprising:

generating, by the photodetector, photo-current in response to receiving light;

accumulating charge on the first integration capacitor corresponding to the photo-current;

diverting, with the charge diverting switch, the photo-current to the second integration capacitor in response to a voltage across the first integration capacitor exceeding a threshold voltage level; and reading-out, in a first most of operation, a first voltage sample from the first integration capacitor corresponding to charge accumulated on the first integration capacitor;

coupling, in a second mode of operation, the first integration capacitor in parallel with the second integration capacitor;

reading-out, in the second mode of operation, a second voltage sample corresponding to charge accumulated on the second integration capacitor; and analyzing the first voltage sample and the second voltage sample to determine whether either one of the first voltage sample and the second voltage sample is invalid.

12. The method of claim 11, further comprising receiving, with the charge diverting switch, a bias voltage, and wherein diverting the photo-current to the second integration capacitor in response to the voltage across the first integration capacitor exceeding the threshold voltage level includes diverting the photo-current to the second integration capacitor in response to the voltage across the first integration capacitor exceeding the bias voltage.

13. The method of claim 11, further comprising decoupling with a shutter switch, in the first and second modes of operation, the photodetector from the first integration capacitor and the charge diverting switch.

14. The method of claim 11, wherein analyzing comprises:

determining that the first voltage sample is invalid in response to identifying that the first voltage sample indicates a saturated first integration capacitor; and determining that the second voltage sample is invalid in response to identifying that the second voltage sample is substantially at a reset level.

15. An image sensor comprising:

an image processor; and a plurality of unit cells coupled to the image processor and configured in an array, each unit cell comprising:

a photodetector configured to generate a photo-current in response to receiving light;

a first integration capacitor coupled to the photodetector and configured to accumulate charge corresponding to the photo-current;

a second integration capacitor configured to accumulate charge corresponding to the photo-current;

a charge diverting switch coupled to the photodetector and configured to selectively couple the first integration capacitor to the second integration capacitor and divert the photo-current to the second integration capacitor in response to a voltage across the first integration capacitor exceeding a threshold voltage level; and means for reading-out a small well voltage sample from the first integration capacitor to the image processor in a first mode of operation and for reading-out a large well voltage sample from the second integration capacitor to the image processor in a second mode of operation, wherein the image processor is further configured to analyze the small well voltage sample and the large well voltage sample from each unit cell to determine whether either one of the small well voltage sample and the large well voltage sample from each unit cell is invalid.

16. The image sensor of claim 15, wherein the image processor is further configured to generate, based on the analysis of the small well voltage sample and the large well voltage sample of each unit cell, a digital image based on at least one of the first voltage sample and the second voltage sample from each unit cell.

\* \* \* \* \*